United States Patent [19]

Carroll Sr. et al.

[11] Patent Number: 5,539,675
[45] Date of Patent: Jul. 23, 1996

[54] AUTOMATED THICKNESS MEASURING DEVICE

[75] Inventors: James J. Carroll Sr., Balliston Lake; Donald B. Sorensen, Soctia, both of N.Y.; Robert S. Thayer, Pittsfield, Mass.

[73] Assignee: General Electric Company, Pittsfield, Mass.

[21] Appl. No.: 176,147

[22] Filed: Dec. 30, 1993

[51] Int. Cl.⁶ .................................................. G01B 7/00
[52] U.S. Cl. ............................................ 364/560; 364/563
[58] Field of Search ................................. 364/560–564; 324/230, 227, 232, 229, 226, 240; 33/707; 356/381; 73/622

[56] References Cited

U.S. PATENT DOCUMENTS

| | | | |
|---|---|---|---|
| 4,005,360 | 1/1977 | Ott | 324/230 |
| 4,083,002 | 4/1978 | Allport | 324/227 |
| 4,798,002 | 1/1989 | Salzer et al. | 33/707 |
| 5,218,868 | 6/1993 | Yamazaki et al. | 73/22 |
| 5,293,118 | 3/1994 | Grossmann et al. | 324/229 |
| 5,343,146 | 8/1994 | Koch et al. | 324/230 |

*Primary Examiner*—James P. Trammell

[57] ABSTRACT

This invention is directed to an automated measuring device capable of measuring the thickness of essentially any shaped article generally of any materials that is non magnetic. The measuring device of this invention comprises in combination (1) electrical controlling means, (2) magnetic thickness measuring means, (3) mounting means for mounting the article to be measured, (4) computer means for programming the measuring means for measurement of the thickness at predetermined points on the article and (5) means for collecting and recording thickness measurements. Electrical controlling means are employed to control movement of the article to be measured or controlling movement of the magnetic measuring means or a combination of both. The magnetic measuring means comprise a magnetic probe and a magnetic metal ball such that when in a measuring mode, the tip of the magnetic probe is positioned on the side of the article opposite from the magnetic ball and is in magnetic contact through the article. The electrical controlling means may be through digital indexing stepper motors, servo motors or air actuators.

15 Claims, 1 Drawing Sheet

AUTOMATED THICKNESS MEASURING DEVICE

FIELD OF THE INVENTION

This invention relates to an automated measuring device capable of measuring thicknesses of almost any article whether it be round, square, flat, or other irregular shape and generally of any material through which magnetic forces can pass. The automated device of this invention employs magnetics for measuring or gauging the thickness of parts, which hereinafter shall be generally referred to as wall thickness.

BACKGROUND OF THE INVENTION

Current methods of measuring articles are essentially done by hand or some mechanical version of hand measuring. As such, to measure any complicated or irregular shaped article becomes tedious and time consuming. Hollow container articles such as round or square bottles or other types of containers are even more difficult to measure and are also time consuming. To decrease the measuring time, bottles, for example, have been cut in half or in sections for measuring. Unfortunately, if only one of the cut sections is measured, this only provides part of the picture for determining uniform thickness. The changing of process conditions or machine conditions in order to achieve the required thickness or to meet specifications based upon only measuring a section of the article would be inadequate for producing acceptable parts. If, on the other hand, the whole bottle is measured, this can take hours and if machines or process adjustments need to be made, many unacceptable or out of specification bottles would be made before the deficiency or discrepancy in wall thickness was realized and corrected. Therefore there is a need in the industry for the speedy measurement of articles particularly mass produced articles such as bottles, cans, trays, sheets, film, thermo and vacuum formed articles, etc. It is obvious that a speedy device for accurately measuring thicknesses has many advantages particularly cost and time saving advantages.

SUMMARY OF THE INVENTION

The present invention is directed to an automated device for measuring the thickness of almost any article. It is particularly useful for measuring the wall thickness of hollow articles such as bottles whether the bottles are glass or plastic. Briefly, with respect to the bottle, the mechanism of the invention comprises means for rotating a bottle about its central axis while moving the bottle along its central axis. Magnetic measuring means are employed to measure the thickness of the part. The measuring means may be held constant in a fixed position or may be moveable. The magnetic measuring means consists of a magnetic probe and a magnetic metal ball. The magnetic measuring means automatically records the wall thickness circumferentially and axially along the wall of the bottle at each location programmed into a computer. Measurement readings are sent to a recording means. The apparatus of this invention can make multiple measurements as programmed and are made accurately and are quickly recorded, virtually eliminating operator error. Thicknesses can be measured from 0.0001" to about 0.500" or thicker, depending on the equipment and size of the article to be measured. The computer can be so programmed that measurements on a bottle can be made from less than 1° to 360° (full circle) or any increments thereof around a bottle, as well as any incremental measurements of the side wall thickness in a direction relative to the axis of the bottle, i.e. measuring the wall thickness linearly in a direction parallel to the axis of the bottle. While this invention discloses a magnetic measuring means as being fixed while the bottle moves, the opposite can also be achieved, i.e. the measuring means moves, while the bottle remains stationary. In fact, a combination of these two motions can also be employed herein.

DETAILED DESCRIPTION OF THE INVENTION

Figure 1:
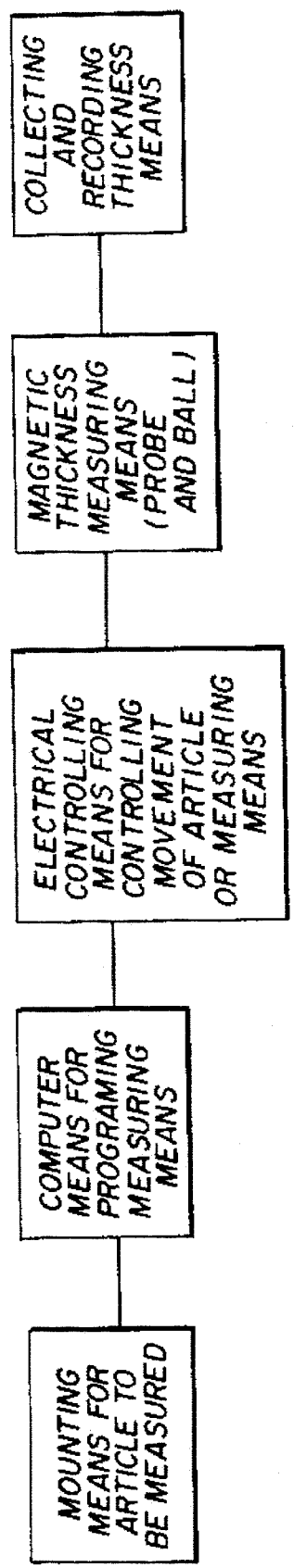

This invention is directed to an automated measuring device made up of a combination of various components. Although the component parts may be available commercially, the novelty of this invention is in the combination of the component parts that has resulted in this novel and unique invention for measuring thicknesses of parts of almost any shape, design or composition. For example, such parts include, but are not limited to, round bottles, square bottles, sheet and film (solid or foam), trays, thermo and vacuum formed articles, injection molded articles, tubing, pipe, automotive parts, etc. and in general any part that has a thickness can be measured with the measuring device of this invention. The criteria for use of this invention is that the part to be measured is accessible with the magnetic probe and magnetic metal ball and further that the material of the part being measured is non-magnetic FIG. 1 is a schematic of a broad embodiment of the automated measuring device of this invention. In the broad embodiment of this invention, the measuring device or apparatus comprises in combination (1) electrical controlling means, (2) magnetic thickness measuring means, (3) mounting means for the article to be measured, (4) computer means for programming the measuring means for measurement of thickness at predetermined points on the article and (5) means for collecting and recording thickness measurements. Electrical controlling means may be employed to control movement of the article to be measured or controlling movement of the magnetic thickness measuring means. In addition, a combination of electrical controlling means may also be employed in the practice of this invention such that electrical controlling means may be employed to control both article movement and magnetic measuring means movement such that both motions may be controlled alternately.

As stated, computer means are employed herein for programming the measurement means. However, physical or manual setting of the angle of the measuring means to measure the thickness of an odd shaped section of the article to be measured may also be performed manually so as to insure that the measuring means is essentially perpendicular to the surface of the article at the point of contact and measurement. When subsequent repetitive articles are being measured, then the manual setting of the measuring means can be programmed into the computer for automatic setting of the measuring means at the same measurement point on the article and then automatic measurements thereafter for the same articles being measured. This is particularly advantageous when there are irregular shaped sections of articles to be measured such as the handle of a plastic bottle or indentations on a bottle.

In one embodiment for measuring bottles, the apparatus of this invention comprises at least three electrical controlling means, rotary indexing means for circumferential movement and control of the bottle, linear indexing means for axial movement and control of the bottle, a thickness gauge means consisting of a magnetic probe and magnetic metal ball, which when in a measuring mode or orientation is in contact with the surface of the bottle to be measured and the magnetic metal ball is positioned opposite from the tip of said probe but on the side of the part opposite from the tip of the probe and being in magnetic contact through the part to be measured with the tip of said probe. The magnetic probe employs a permanent magnet, an electromagnet or a combination of such magnets. The apparatus described herein has bottle mounting and centering means, software program for programming and designating points of measurement, and hardware for collecting and recording measurement data. Optionally, a digital dial indicator may also be employed which would be in contact with the surface of the bottle to be measured and which registers concentricity of the bottle.

The three electrical controlling means comprise in combination one electrical controlling means for controlling the rotary indexing means which controls rotational movement of the bottle, one electrical controlling means for controlling the linear movement of the bottle relative to the axis of the bottle and one electrical controlling means for controlling the angular definition of the magnetic probe in order to follow the contour of the bottle but yet to keep the probe essentially at a right angle to the part of the bottle being measured. The vertical up and down or in and out movement of the probe, however, relative to the surface contour of the bottle or article being measured may be through gravity alone if the probe is positioned on top of the bottle, for example, or by a spring actuated probe if the probe is positioned at the bottom or side of the bottle. In addition, the probe may be actuated and controlled by electrical controlling means. In essence, the probe is floating in an up and down or in and out motion which it is controlled by gravity, spring actuated, electrically actuated, air actuated, etc. If the probe is being electrically actuated in an up and down motion or in and out, the probe must still have some degree of free floatation in addition to the electrical controlling means to insure that the probe remains in contact with the surface of the article being measured, particularly for irregular shaped contoured surfaces. In either of the cases with respect to the probe, the probe must be essentially perpendicular to the surface of the bottle or article being measured at the point of measurement.

This is particularly necessary in order to obtain accurate measurements of the bottle, in that the probe should be essentially perpendicular to the part of the bottle at each point of measurement.

The measuring means comprise a thickness gauge consisting of a magnetic probe and a magnetic metal ball. Magnetism may be through use of a permanent magnet (preferred) or an electromagnet or a combination of both. In a measurement mode, the magnetic metal ball is positioned opposite from the tip of the magnetic probe on the side of the wall to be measured and is in magnetic contact with the tip of the probe.

In a preferred embodiment of this invention, the electrical controlling means comprise digital stepper motors and controlling means therefore. The digital stepper motors are indexing motors varying from 0.9° on up (angular displacement of the rotor in the motor) with varying steps up to about 400 per revolution. However, microstepping can also be employed resulting in up to 50,000 steps per revolution. Therefore, the measuring apparatus of this invention is capable of measuring any point on the circumference of a bottle from less than 1° to any incremental point up to 360°.

With respect to the bottle measurement apparatus, the rotary indexing means provides rotary or circumferential rotation or movement of the bottle around the axis of the bottle and indexing at points predetermined for measurement and which are set through the stepper motor for controlling rotation. For the linear movement of the bottle, the linear indexing means such as a table or screw device for advancing the bottle when in a measuring orientation or mode provides for linear movement of the bottle along the axis of the bottle. Linear movement is controlled through the stepper motor which in turn has controlling means therefore.

Generally, as a practical matter, the bottle is in a horizontal position for measurement i.e. the axis of the bottle is horizontal with the magnetic measuring probe being perpendicular to the surface of the bottle. However, the bottle may be in a vertical position with the magnetic probe being essentially horizontal to the vertical axis of the bottle when the probe is in a measuring mode. When the bottle is in the horizontal position, the magnetic probe may be essentially in a vertical position relative to the horizontal axis of the bottle and may be positioned on the top side of the bottle or on the bottom side of the bottle relative to the horizontal position of the bottle. In either case the bottle is generally held by a clamping device or means over the base and a holding device or means at the mouth of the bottle. When employing a base clamping means, the base of the bottle would not be accessible for measuring. With respect to the placement of the magnetic probe, it may be in any position either vertical, horizontal or at an angle to the side of the bottle or part being measured.

To measure the base thickness of a bottle, it is necessary to clamp the bottle at another location, for example, the middle of the bottle such that the base of the bottle would be exposed for measuring. Generally, it is preferred to measure the bottle in a horizontal position when measuring the base. In measuring the base of the bottle, the magnetic probe may be held by a flexible robot. The flexible robot would be flexible at each joint of the robot. For each movement of the robot, preferably a servo motor is employed with controlling means therefore. Thus, there can be any number of servo motors employed in controlling the robot. For each servo motor, a controller is needed which could be driven by inputs from a computer. Therefore, with a flexible robot, the base of a bottle can be measured. Since a different holding mechanism is employed for the bottle and a different holding means for the probe, namely a robot, it is preferred that a separate apparatus be used for measuring the base of the bottle from the apparatus that would be employed for measuring the other part of the bottle which is as described previously. However, it may be possible to combine both features in one apparatus and such would be included within the scope of this invention.

With respect to measuring various angles of the bottle, the probe through the stepper, or what have you, motor and controller for the motor can be preprogrammed to move in accordance with the angles or irregular shape of the bottle, other than linear (axial) or circumferential. Since the angles are known from the design of the mold employed to mold the bottle, the angles can be preprogrammed and thus control the probe for measuring irregular shapes of the bottle.

While one type of indexing motors described herein are digital indexing stepper motors, servo motors or air actuators (linear or rotary) may also be employed. However, stepper motors are generally preferred except as indicated elsewhere in this invention. A combination of digital stepper motors and servo motors may be also employed herein as well as combinations with air actuators. Digital stepper motors may be defined as being digital, whose speed varies with the rate of pulses being applied to it. They are typically controlled utilizing step and direction digital controls. Servo motors, on the other hand, are defined as analog in nature, whose speed varies with the current applied to it. There are many types of servo motors, i.e. direct current (DC), alternating current (AC) brushless DC, etc. One skilled in the art of motors would be well acquainted with digital stepper motors and servo motors as well as air actuators.

Air actuators are activated by a gaseous medium, which is preferably air. The air or gaseous medium is controlled by simply turning on or off the flow of air. Air actuators may be either linear or rotary and are well known to those skilled in the art.

In one embodiment of this invention, the measuring probe and ball remain essentially stationary, while the bottle is moved circumferentially and axially. In another embodiment of this invention, the probe and ball may be moved linearly, i.e. axially along the length of the bottle and the bottle is indexed circumferentially. Measurements can be made at any preprogrammed point linearly along the surface of the bottle parallel to the axis of the bottle. Alternatively, combinations of both functions can be used, i.e. linear movement of the bottle while the magnetic probe remains stationary and linear movement of the probe, while the bottle remains stationary. This would also be coupled with rotational indexing of the bottle as described previously.

However, in any of the embodiments described herein, faster bottle through put can be achieved by selection of faster stepper or servo motors or air actuators or combinations of such.

For positioning and holding the bottle, any known clamping means can be employed provided they do not interfere with operation of the controlling motors or measurement of the bottle. In this invention, a split ring clamp was employed around the base of the bottle. It may also be employed around the neck of the bottle depending on the choice of the artisan or if the bottle is in the horizontal or vertical position. Adjusting screws may also be employed herein to provide for even rotation of the bottle with little or no wobbling. With a clamping means at the base of the bottle to be measured, a pin through the cap of the bottle was employed to aid in centering of the bottle. While bottles (glass or plastic) are not true circles or true circumferentially, the bottle should rotate as concentrically as possible. The clamping device with adjusting screws and pin in the cap help to align the bottle for concentric rotation.

Also included with the apparatus for measuring round bottles, although optional, is a digital dial indicator. The dial indicator can indicate concentricity of the bottle when mounted and rotated. The digital dial indicator affords a means for aiding in adjusting the centering of the bottle in order to achieve concentricity of the bottle during rotation. The digital dial indicator would also tell the operator if the bottle is out of round. While adjustments to the apparatus can not generally be made to compensate for out of roundness, it can at least be useful information since out of round occurs in the molding of the bottle. This could allow one to make physical changes in the contour of the surfaces of the mold, or adjust molding temperatures or positioning of the parison to compensate for out of roundness if one so desires.

As stated previously, the measuring apparatus of this invention is also applicable not only for bottles as so described herein but also for irregular shapes. Therefore, another embodiment of this invention is an automated apparatus for measuring articles other than a bottle, which apparatus comprises the same component electrical controlling means as employed with the bottle measuring apparatus as well as the magnetic thickness gauge means, a movable mounting surface that is capable of horizontal and vertical movement and securing means for mounting the article to be measured to the mounting surface. While the electrical controlling means may be either digital indexing stepper motors or servo motors or air activators or combinations thereof, the following is described in terms of the stepper motor. One stepper motor is employed for controlling movement of the mounting surface horizontally in a relative north-south direction; one stepper motor is used for controlling movement of the mounting surface horizontally in an east-west direction relative to the direction of the movable mounting surface in the north-south direction; one stepper motor for controlling movement of the mounting surface vertically and controlling means for controlling the movement of the magnetic probe and ball in an up and down motion in order to follow the contour of the surface to be measured. Such controlling means for controlling the movement of the magnetic probe may be the same as described previously i.e. gravity, spring loaded or air actuated. Additionally, a fifth stepper motor may also be employed with the probe for positioning the probe at an angle which can vary up to 360°. Alternatively, it may be desirable to move the magnetic probe over the surface of the article while the article remains stationary. In this embodiment, the probe may have a sixth digital stepper motor for movement of the magnetic probe over the surface of the article to be measured. Obviously, if such is employed, stepper motors for movement of the mounting surface may not be necessary or engaged. Another alternative is a combination of moveable mounting surface as described above and moveable probe may be employed. For example, for some measurements, the mounting surface may be stationary and the probe moveable. For others measurements, the probe may be stationary and the mounting surface moveable. Visually, this operation or movement may be said to be similar to a milling machine wherein a milling machine has a table or lathe bench horizontally moveable in the north-south-east-west direction relative to each other, is moveable vertically and has a drill or such other attachment that can perform in a vertical position or at an angle from the vertical.

A further embodiment of this invention is a simple apparatus for measuring a flat object such as a sheet or film. This apparatus comprises one electrical controlling means such as a digital indexing stepper motor and a magnetic thickness gauge device (magnetic probe and magnetic metal ball) as previously described. One combination comprises a table or flat surface over which a flat sheet or film moves or travels. The flat surface over which the flat article would travel has a groove in which the magnetic ball would be free to travel. The groove may be perpendicular to the direction of travel of the sheet of film. The digital stepper motor controls the movement of the magnetic probe over the groove in a horizontal direction across the sheet. In this case, the magnetic probe is in a vertical position perpendicular to the surface of the sheet or film. For film or sheet that is not wide, it is possible that a table or flat surface may not be necessary and that the magnetic force alone would keep the ball in contact with magnetic probe, while still being capable of moving across the sheet, i.e. across the sheet or film in a direction perpendicular to the surface of the sheet or film under the probe. Alternatively, the magnetic probe may be kept stationary while the sheet or film is moving.

It will thus be seen that the objects of this invention as set forth above among those made apparent from the preceding description are efficiently attained and since certain changes may be made in carrying out the above invention, it is to be understood that the invention is not limited to this precise form. Changes and modifications may be made thereon without departing from the scope and spirit of the invention as defined in the appended claims.

What is claimed is:

1. An automated measuring apparatus for measuring the thickness of an article comprising in combination measuring means consisting of a magnetic probe and a magnetic metal ball, electrical controlling means, a computer means for programming the movement of the magnetic measuring means for measurement at predetermined points and means for collecting and recording measurements.

2. The automated measuring apparatus of claim 1 wherein the electrical controlling means is a digital stepper motor with a controller for said stepper motor.

3. The automated measuring apparatus of claim 1 wherein the electrical controlling means is a servo motor with a controller for said servo motor.

4. The automated measuring apparatus of claim 1 for automatically measuring the thickness of a bottle comprising in combination at least three electrical controlling means, rotary indexing means, linear indexing means, thickness gauge device consisting of a magnetic probe and a magnetic metal ball which in the measuring mode the magnetic metal ball is positioned on the side of the bottle part opposite from said probe and being in magnetic contact with said probe through the bottle part to be measured, means for mounting and centering the bottle and computer hardware means for collecting and recording measurement data, said electrical controlling means comprising:

one electrical controlling means for controlling the rotary indexing means in order to rotate the bottle around the axis of the bottle, one electrical controlling means for controlling the linear indexing means in order to move the bottle in a linear motion with respect to the axis of the bottle, one electrical controlling means for controlling the angular definitions of the magnetic probe and magnetic metal ball such that the probe is essentially at a right angle to the bottle part being measured, wherein said magnetic probe is gravity actuated.

5. The electrical controlling means of claim 4 comprising digital indexing stepper motors with controlling means for said stepper motors.

6. The digital stepper motors of claim 5 comprising microstepping motors capable of being programmed to measure essentially any point on the circumference of the bottle at any incremental point from less than 1° up to 360°, which microstepper motor comprises in excess of 400 steps per revolution of the bottle.

7. The electrical controlling means of claim 4 comprising servo motors with controlling means for said servo motors.

8. The automated apparatus of claim 4 having in combination therewith a fifth electrical controlling means for controlling the movement of the magnetic probe in a linear direction relative to the axis of the bottle such that the magnetic probe is capable of being moved linearly while the bottle remains rotably stationary.

9. The automated apparatus of claim 4 having in combination therewith a digital dial indicator which can be so oriented as to be in contact with the surface of the bottle to be measured and which dial indicator registers the concentricity of the bottle.

10. The automated measuring apparatus of claim 1 for automatically measuring the thickness of all article other than a bottle comprising in combination at least four electrical controlling means, a magnetic thickness gauge means consisting of a magnetic probe and a magnetic metal ball which in the measuring mode is positioned on the side of the part opposite from the tip of said probe and being in magnetic contact with the tip of said probe through the part to be measured, a movable surface means having means for securing the article to be measured to the moveable surface, means and computer hardware means for collecting and recording measurement data; said electrical controlling means comprising:

one electrical controlling means for controlling the movable surface horizontally in a relative north-south direction, one electrical controlling means for controlling the movable surface horizontally in an east-west direction relative to the direction of the movement of the movable surface in the relative north-south direction, one electrical controlling means for controlling the movable surface in a vertical direction, and one electrical controlling means for controlling the angular definition of the probe and ball such that the probe will always be essentially at a right angle to the wall of the article being measured; and wherein said magnetic probe is gravity actuated.

11. The automated apparatus of claim 10 having in combination therewith air actuated means for controlling the in and out movement of the probe relative to the contour of the surface of the article being measured.

12. The automated apparatus of claim 11 having in combination therewith a sixth electrical controlling means for controlling the movement of the said magnetic probe over the surface of the article to be measured.

13. The automated apparatus of claim 10 wherein the electrical controlling means are digital indexing stepper motors with a controlled means for each such stepper motors.

14. The automated apparatus of claim 10 wherein the electrical controlling means are servo motors with controller means for each servo motor.

15. The automated apparatus of claim 1 comprising in combination at least three digital indexing stepper motors, magnetic thickness gauge device consisting of a magnetic probe and a magnetic metal ball which in the measuring mode, said ball is positioned on the side of the article opposite from the tip of said probe and being in magnetic contact with the tip of said probe through the article to be measured, mounting surface means for mounting the article to be measured on said mounting surface and computer hardware means for collecting and recording measurement data, said digital indexing stepper motors comprising:

one such stepper motor for controlling the movement of the probe over the surface of the article to be measured, one such stepper motor for controlling the angular definition of said magnetic probe and ball relative to the contour of the surface of the article to be measured such that said magnetic probe is essentially at a right angle to the surface of the article at the point of measurement.

* * * * *